(No Model.)
C. S. RUEF.
DRAFT EQUALIZER.
No. 485,138.　　　　　　　Patented Oct. 25, 1892.
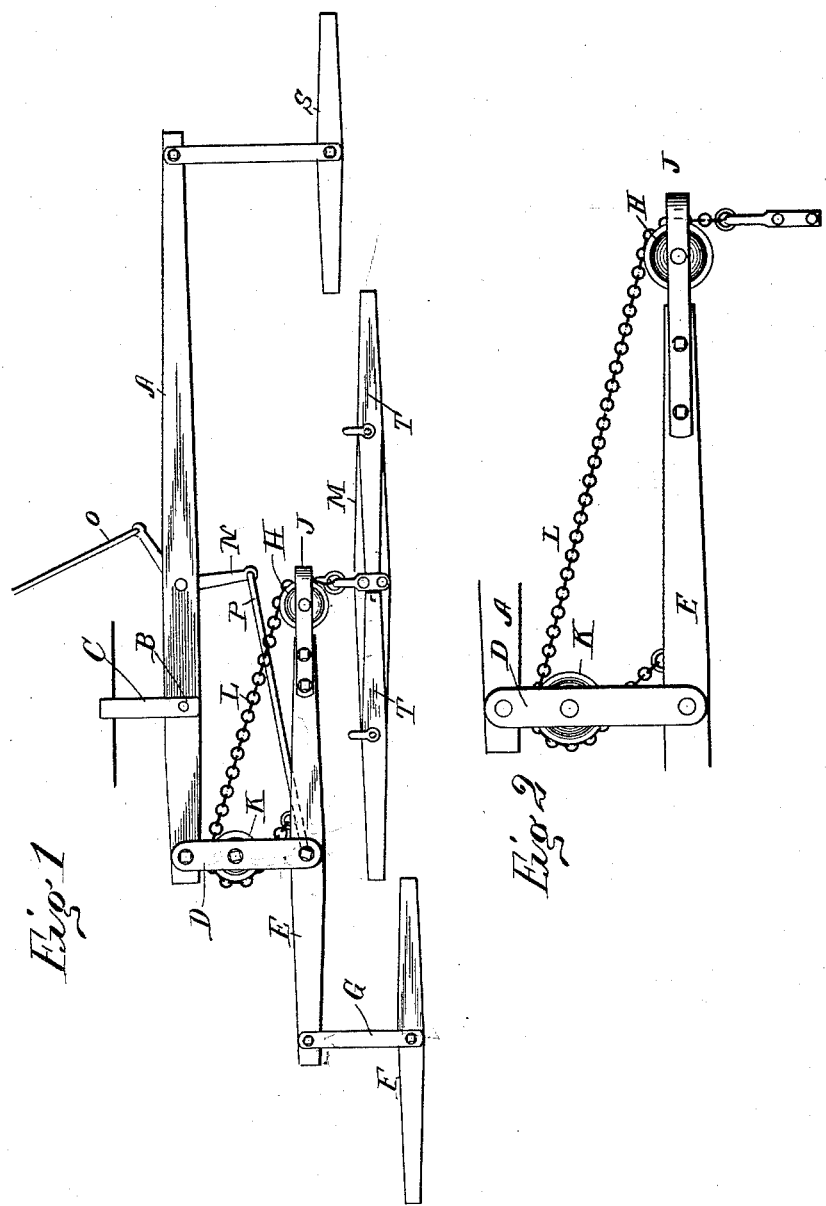
Witnesses
C. C. Burdine
J. B. Owen Jr.
Inventor
Charles S. Ruef
per John G. Manahan
his Attorney

UNITED STATES PATENT OFFICE.

CHARLES S. RUEF, OF DIXON, ILLINOIS, ASSIGNOR TO THE GRAND DETOUR PLOW COMPANY, OF SAME PLACE.

DRAFT-EQUALIZER.

SPECIFICATION forming part of Letters Patent No. 485,138, dated October 25, 1892.

Application filed July 28, 1892. Serial No. 441,484. (No model.)

*To all whom it may concern:*

Be it known that I, CHARLES S. RUEF, a citizen of the United States, residing at Dixon, in the county of Lee and State of Illinois, have invented certain new and useful Improvements in Four-Horse Eveners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in four-horse eveners and has special application to attachments to plows, in which situation it is essential that the horse at the plowed-ground side shall have a fixed position in reference to the plow or plows in order that he may walk in the furrow and not be compelled to walk on the plowed ground. The situation last referred to requires a peculiar arrangement of the several singletrees, so that the center of the team may be to the land side of the center of draft.

My invention is further adapted for use in those situations in which the plow is turned around at the ends by lateral draft, as distinguished from the type of plows in which the plow is turned by the tongue.

In the class of plows, mainly two-wheeled plows, in which the plow is turned coincidently with the lateral movement of the tongue, a much simpler situation is presented, while in the class of plows with which my invention is more especially adapted to be used and in which the tongue is pivoted at its rear end and the team is turned nearly or quite at right angles with the plow before the turning of the latter begins a peculiar arrangement of the whiffletrees and evener is required to preclude any confusion or intermingling of the several whiffletrees in the act of turning.

In my invention, as will be observed, the "nigh" horse draws on one end of the evener, which for distinction will be called the "inner end," by a singletree S, and the other three horses draw on the opposite or outer end of said evener. The last-named three horses draw on a common whiffletree, to the outer end of which the "off" or furrow horse is attached by a singletree F, and to the inner end the two inner horses are attached by singletrees T T and by their common doubletree by means of a chain, hereinafter more specifically described, which passes over a grooved pulley pivoted to the inner end of the three-horse doubletree.

The distinguishing peculiarity in my invention in this regard is in the fact that the ultimate point of attachment of the two inner horses is to the rear side of the three-horse doubletree, between the point of its attachment to the rear evener and the grooved pulley aforesaid, by means of which the two inner horses at the point of ultimate attachment of the chain aforesaid draw backward upon the three-horse evener near the pivotal point of the latter and to some extent in the opposite direction from that in which they draw over the pulley aforesaid and at said point of ultimate attachment assist in some degree the off or furrow horse in his forward draft upon the outer end of the said three-horse whiffletree.

My invention has been thoroughly subjected to practical tests, and its present construction is the result of such tests and fully accomplishes the purpose of permitting the off horse to walk in the furrow and at the same time causes the draft to be equally distributed among the four horses, which are thereby allowed to be worked abreast. I attain these objects by the mechanism illustrated in the accompanying drawings, in which—

Figure 1 is a plan view of my invention in position for operation. Fig. 2 is a detail of the draw-chain and its attachments.

Similar letters refer to similar parts in both views.

A is the main evener, to which the draft of all the horses is attached and which is projected transversely to the line of movement and pivotally connected at the point B thereon to the plow. It will be noticed that the point B is comparatively near the outer end of the evener A, and that therefore the inner end of said evener is projected some distance over the unplowed land. A clevis C, pivoted to the evener A at the point B, affords the means of attachment of said evener to the plow.

The entire distance between the point of attachment of the single horse to the inner end of the evener A and the point of attachment thereon of the other three horses is fifty-one inches, and the distance between the point B and said point of attachment of the three horses is sixteen inches.

To the outer end of the evener A is pivotally attached the rear ends of the bars D, one of which is attached on the top of said evener and the other on the bottom thereof. The bars D are projected forwardly substantially in the line of movement and pivotally attached in like manner at their front ends to the three-horse whiffletree E. The singletree F of the furrow horse is pivotally attached by like bars G to the outer end of the whiffletree E, and the inner end of the whiffletree E is provided with the horizontal grooved pulley H, pivotally seated in an iron loop J, the ends of which are rigidly attached to the upper and lower surfaces of the inner end of said whiffletree E. A second grooved pulley K is pivotally seated horizontally in and between the bars D and intermediate the whiffletree E and the outer end of the evener A. A chain L is attached at its front end centrally at the rear side of the doubletree M of the two inner horses and passed backward over the pulley H and under the loop J on the inner end of the evener E and diagonally behind and around the pulley K and attached at its opposite or rear end to the back side of the evener E, near the pivotal seat of the latter, and between such pivotal seat and the pulley H. The distance from the point of attachment of the furrow horse to the whiffletree E and the pivotal seat of the latter is nineteen inches and the distance from such said pivotal seat to the chain-bearings of the pulley H is twenty-six inches. The variance between the two spaces last named is so small that were the two inner horses attached rigidly to the inner end of the whiffletree E the furrow horse would be required to draw out of all proportion to the draft of said two inner horses; but, as will be observed, the attachment of the two inner horses to the inner end of the whiffletree E is not the ordinary pivotal one, but consists of the chain L, passing over the pulley H, whereby the draft of said two inner horses extends back over the pulley K and finds its ultimate attachment at the rear of the whiffletree E, as aforesaid, where said ultimate attachment is utilized to move the whiffletree E in the same direction—that is to say, backward—that the forward draft of the furrow horse would move it and to the extent that the draft of the two inner horses is supplementary to that of the furrow horse. However, the draft of the two inner horses is not all applied at said point of ultimate attachment of the chain K; but a large portion of said draft is exerted upon the pulley H and an additional portion upon the pulley K, so that the residue of unexpended draft of the two inner horses, which is applied to the rear side of the whiffletree E, as aforesaid, is only sufficient to so supplement the draft of the furrow horse as that his draft shall be equal to that of each of the said two inner horses.

In order to further equalize the draft between the nigh horse and the other three in the varying positions of the evener A, a yoke N is pivoted centrally under the evener A at a point within the pivotal attachment B of the latter, and said yoke is projected across the evener A diagonally with its rear end extending toward the unplowed land and is pivotally connected at its rear end by means of a rod O rearward to a suitable point on the plow or its frame and pivotally connected at its front end by a similar rod P, projected diagonally outward, and pivotally attached at its front end to the lower end of the center bolt R in the whiffletree E.

What I claim as my invention, and desire to secure by Letters Patent of the United States, is—

1. The combination of the evener A, provided at its inner end with the singletree S, the clevis B, the pivotal plates D, the pulley K, the whiffletree E, provided with the pulley H, the singletree F, the doubletree M, provided with singletrees T T, and a chain L, attached centrally at its front end to the rear of the doubletree M and passed backward over the pulley H and behind the pulley K and brought forward and attached at its opposite end to the rear end of the whiffletree E between the pivot R of the latter and said pulley H, substantially as shown, and for the purpose described.

2. The combination of the evener A, singletree S, yoke N, rods O and P, plates D, pulley K, pivotally seated between said plates, evener E, provided with pulley H, singletree F, doubletree M, provided with singletrees T T, and the chain L, attached at its forward end to the center of the rear of the doubletree M and passed backward over said pulley H and behind pulley K and brought forward and attached at its rear or opposite end to the whiffletree E between the pivot R of the latter and said pulley H, substantially as shown, and for the purpose described.

In testimony whereof I affix my signature in presence of two witnesses.

CHARLES S. RUEF.

Witnesses:
L. D. DEMENT,
AMOS BOSWORTH.